INVENTOR.
EUGENE G. DANNER
BY
Kenneth E. Merklen
ATTORNEY

United States Patent Office 3,487,786
Patented Jan. 6, 1970

3,487,786
THRUST COMPENSATING IMPELLER
Eugene G. Danner, 9122 71st Road,
Forest Hills, N.Y. 11375
Filed Oct. 25, 1967, Ser. No. 678,070
Int. Cl. F04d 29/66, 29/18, 13/02
U.S. Cl. 103—112   4 Claims

ABSTRACT OF THE DISCLOSURE

A fluid impeller which incorporates an annular hydrofoil which, when rotated has thrust compensating characteristics. The impeller includes blades for driving or flowing the environmental fluid when rotated therein and a flat, beveled thrust ring which rotates with the impeller blades and in the environment. The thrust of the impeller blades developed by rotating the blades in the environment is balanced out or fully compensated for by the anti-thrust force developed by rotation of the flat, beveled thrust ring in the same environment at the same speed.

---

The present invention relates to fluid and/or liquid impellers which have thrust balancing characteristics when rotated in a mass. In particular the present invention relates to an impeller of novel construction which is self-balancing with respect to thrust developed during rotation of the impeller in a mass. The impeller is constructed with a hub and blades extending therefrom. The hub and blades assembly is preferably substantially balanced with respect to weight distribution and fluid impelling power. In addition the assembly includes a thrust balance ring through which the impelled fluid and/or liquid may freely pass during rotation of the impeller and which during rotation generates a thrust balancing or thrust compensating force which is proportional to the speed of rotation of the assembly thus generating a thrust compensating force which is linearly proportional to the thrust developed by rotation of the impeller.

From another aspect the present invention is a greatly improved pumping and/or circulating device for pumping, circulating and/or agitating fluids, particularly liquids. Such improved device includes an impeller having thrust balancing or thrust compensating characteristics when rotated thereby permitting use of a drive means or drive motor of lighter construction than heretofore considered practical. The use of a light construction drive means provides a pumping and/or circulating device which is quiet during operation, more efficient, has longer life, lighter construction and may be manufactured at greatly reduced cost.

The present invention is particularly useful in low pressure pumping, circulation and/or agitating of liquids such as water in an aquarium or pool. By way of example the present invention will be described in accordance with its use as a water circulating device. Such water circulation device may be used for circulating water in an aquarium tank or pool in order to maintain an evenly distributed temperature or for circulation of water through a filter system for cleaning the water in the aquarium, tank or pool.

Circulation of water for cleaning by filtering and/or for maintaining evenly distributed temperature is a substantially continuing process in aquariums, tanks and/or pools which support fish and other aquatic life. The maintenance of uniform temperature of water, of which water circulation is a very important part, is important in the breeding and/or raising of tropical fish. The cleaning of the water in an aquarium, tank and/or pool by circulating the water through a filter or filter system is also important in the breeding and/or raising of fish. When a circulating device for circulating water is employed in an aquarium supporting fish, the pump or circulating device must be dependable, must operate substantially continuously over long periods of time and preferably operate with very little noise. This is especially true in equipment designed for use in a home or place of study.

In attempting to make a less expensive water circulating and pumping device having a motor driven, submerged impeller I found that the relative high cost of such device was due to the use of a motor of relatively heavy construction. The use of a motor of relatively heavy construction was necessary in order to withstand the thrust generated by the impeller during rotation of the impeller.

In developing the present novelly constructed impeller, with thrust balancing characteristics, the effect of thrust on a motor used for rotating an impeller has been eliminated so that use of a motor of light construction is now possible. The use of a motor of light construction for driving the thrust balancing impeller provides a pumping and/or circulating device which is more dependable, consumes less power, operates with less noise and is less expensive to manufacture than similar devices using motors of heavier construction.

It is therefore an object of the present invention to provide a device for pumping and/or circulating fluids and particularly liquids which employs an impeller having thrust balancing characteristics when rotated.

Another object is to provide an improved pumping and/or circulating device which employs a motor of very light contruction for driving a thrust balancing impeller.

Another object is to provide an impeller having a hub and blades assembly and an endless hydrofoil coupled to the hub.

Another object is to provide an impeller having thrust balancing characteristics when rotated and such thrust balancing characteristics are proportional to the speed of rotation of such impeller.

These and other objects will be more fully understood by reading the following detailed description with reference to the accompanying drawings in which.

Figure 1:
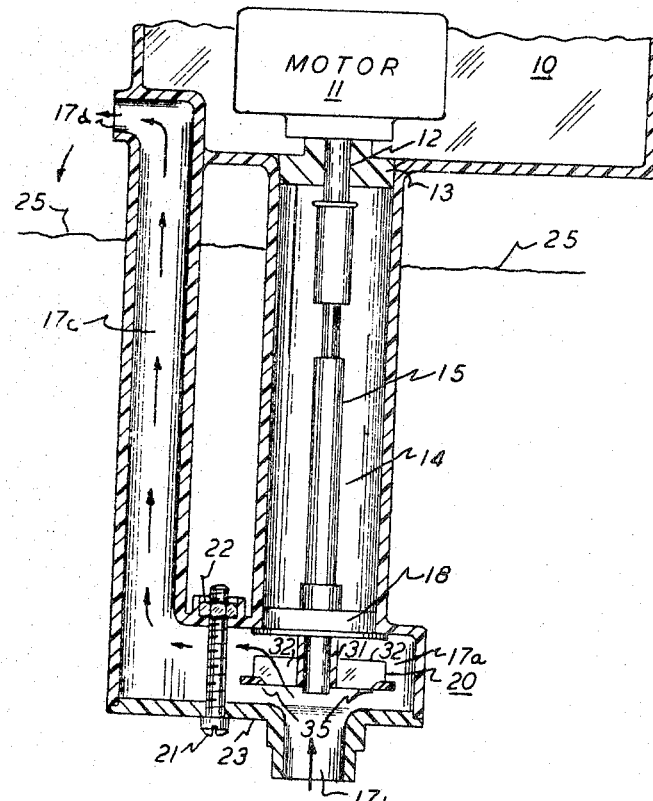
FIG. 1 is a cross section view of a water circulating device employing a thrust balancing impeller.
Figure 2:
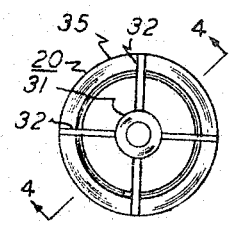
FIG. 2 is a plan view of a thrust balancing impeller.
Figure 3:
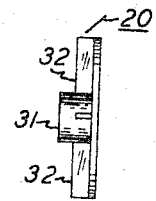
FIG. 3 is a side view of a thrust balancing impeller.
Figure 4:
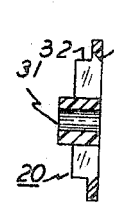
FIG. 4 is a cross section view of the novel impeller shown in FIG. 2 along the line 4—4 and FIG. 5 is an enlarged cross section view of a portion of the thrust compensating ring or annular hydrofoil coupled to the impeller blades.
Figure 5:
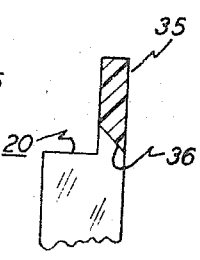

Referring to FIG. 1 in more detail, an improved water circulating device is shown, by way of illustration, in cross section view. The improved water circulating device is a low pressure, water circulator having a motor mounted in an upper housing which is above the surface of the water. A drive shaft extends from the motor through an enclosed shaft and into a submerged chamber. Coupled to that part of the drive shaft extending into the submerged chamber is a thrust balancing impeller which is rotated by the motor through the shaft. The submerged chamber includes an intake, the chamber itself and an outlet which in this illustration includes a passage which opens above the surface of the water. The chamber has a breakaway bottom or lower wall which is held in place by a bolt and nut combination. Removal of the bolt or screw and nut permits removal of the bottom of the chamber and accords a ready access to the impeller within the chamber, on the shaft. Part of the upper wall of the chamber is formed by combination seal which serves as a washer and bearing. The seal is press fitted into the lower section of the housing. The drive shaft is passed through the bearing thus substantially sealing off the enclosed shaft from the chamber below.

The water circulating device is illustrated in an operating condition, that is, in its partly submerged state. The source of power for driving the motor is not shown however, it is anticipated that normal house current would be used for driving such motor through suitable connections, not illustrated.

The frame or housing is essentially divided into three sections. The upper housing or section 10 supports a motor 11 which is positioned above the water level. The upper section may also include a means for hanging or supporting the device, for example on the wall or frame of an aquarium so that the upper section is suspended above the water level. This may be done by a hanger, for example, which effectively hangs the device on the side of the tank or aquarium. The motor shaft 12 extends through an upper isolating seal or washer-bearing combination which isolates the upper section 10 from the enclosed shaft 14. The enclosed shaft 14 extends downwardly into the water and is sealed at its lower end by another isolating seal or washer-bearing combination 18 which substantially seals the lower part of the enclosed shaft 14 when the drive shaft is passed through the bearing.

In this illustration the drive shaft 12 of the motor 11 is shown as being relatively short. Thus, coupled to the drive shaft 12 is a multi-diameter drive shaft extension 15 which passes through the bearing of the lower seal 18 and extends into the chamber 17. The enclosed shaft or enclosed chamber 14 encloses the drive shaft 12/15 and prevents aquatic life from contact with the rotating shaft. If the drive shaft 12 of the motor were sufficiently long so as to extend through the enclosed shaft 14 and into the chamber 17 then the extension 15 would be unnecessary.

The chamber 17 includes the water circulating chamber 17a and the inlet and outlet 17b and 17d respectively. The water inlet 17b and the water outlet 17d are connected by the circulating chamber 17a and a flow chamber 17c which essentially form the third section of the housing. The bottom of the water circulating chamber 17a and the lower part of the flow chamber 17c are formed by a breakaway section 23 which actually includes the inlet 17b. The break away section is press fitted into the walls of the chamber and held by the screw 21 and nut 22 combination.

By removing the screw and nut 21/22 the break away section 23 may be removed and expose the impeller 20 and the washer-bearing or lower seal 18.

In some cases a screen may be used over the inlet 17b to prevent entry of fish and/or other aquatic life into the water circulation chamber 17a.

The outlet 17d is illustrated as positioned above the water level 25.

It may be desired to couple the outlet 17d to a filter arrangement which may be done by use of suitable hosing.

The impeller 20 is shown in several different views in FIGS. 2 through 5. The impeller includes a hub 31 into which the drive shaft 15 is inserted. In some cases a set pin or set screws may be used to prevent slippage of the impeller. Extending from the hub 31 are four spaced blades 32. These are illustrated as rectangular in shape and are coupled to the hub at their narrow ends. Each blade extends lengthwise out from the hub and is positioned essentially flat with its width vertical. An annular anti-thrust force generating member 35 is coupled to the blades with the perimeter of the thrust ring essentially comforming with the radius formed by the impeller blades 32 measured from the center of the hub 31. The anti-thrust member 35 has a flat upper surface extending radially toward the hub and terminating in a bevel 36, leaving an open section between bevel 36 and the hub 31. The anti-thrust or thrust compensating member 35 is described as an annular hydrofoil or endless plane hydrofoil. The radial extension of the plane of the ring 35 is clearly seen in FIG. 2 and the ring terminating interior bevel 36 is clearly seen in FIG. 5, in enlarged form. The width (radial measurement) of the anti-thrust ring 35 determines the amount of thrust compensating force generated upon rotation of the member.

The blades 32 serve to force or push the water in the chamber 17a into the flow chamber 17c and toward the outlet port 17d. The water moving into the circulating chamber 17a via the inlet 17b finds a flow path through the opening in the annular hydrofoil or thrust member 35 between the beveled edge 36 and the hub 31. This path is shown by the arrows.

Circulation of the water occurs during rotation of the impeller 20 by the motor 11. As the impeller 20 rotates in its environment (in this example, water) an axially exerted force or thrust is generated, tending to pull the drive shaft 12 out of the motor 11. The flat beveled thrust ring or annular hydrofoil 35 is also rotated in the same environment. This develops an axially exerted force in the upward direction which essentially opposes the downward exerting thrust developed by rotation of the impeller.

The amount of force generated by rotation of the flat beveled thrust ring is determined by the speed of rotation of the ring and the surface or area of the thrust ring. I have found that at a given rotational speed, for example 1500 r.p.m., the size of the ring or area of the surface of the thrust ring may be such as to generate an upwardly exerted force or anti-thrust force to completely counterbalance the downwardly exerted force or thrust for a given number and size of impeller blade. By increasing the surface area of the thrust ring, which may be functionally an antithrust ring, sufficient upwardly exerted force may be generated during rotation to more than overcome the thrust generated by the rotating impeller. By reducing the surface area of the thrust ring the upwardly exerted force generated by rotation of the ring may be reduced.

By providing an annular hydrofoil of sufficient size or area for generating an upwardly exerted force or anti-thrust force during rotation to balance out or equally offset the downwardly exerted force or thrust generated during the same rotational speed and instant, an impeller having thrust balancing or thrust compensating characteristics is created.

While it is known that the amount of thrust generated by any given impeller is proportional to the rate of rotation of the impeller experimentation has shown that for any thrust ring the amount of anti-thrust developed is also proportional to the rate of rotation.

In actual practice of my invention a very inexpensive light constructed motor, having a loosely seated armature was used to drive my new thrust balancing impeller. This device was successfully operated with the impeller rotated submerged in water, which would be one of the proposed uses of such device. This test device performed excellently and had a long life run.

It will be appreciated that an impeller may have blades having different shape or structure than that herein illustrated. It will also be appreciated that a pumping and/or circulating and/or agitating device may have many uses other than the pumping and/or circulating of water. Such device may be used to pump and/or circulate or agitate other fluids, if desired.

It will further be appreciated that although the thrust compensating component has been shown and described as a flat, beveled ring, such component is not to be limited to such shape. A thrust compensating ring may take the shape of an annular hydrofoil or, in some cases, an annular airfoil. The surfaces of the ring may take any one of several hydrofoil or airfoil contours. However, for commercial purposes, and particularly in the manufacture of a low-cost pump, a flat, beveled ring is preferred.

It will also be appreciated that the invention herein described is not limited to the specific structure, use and form described herein. Changes and modifications, which

What is claimed is:

1. A thrust balancing impeller for moving a portion of a fluid environment including;
   a hub adapted for coupling to a drive means for rotating said impeller in said fluid environment,
   blade means coupled to said hub, rotatable with said hub for moving a portion of said fluid environment upon rotation of said blade means and
   an annular hydrofoil coupled to said blade means by the outer periphery of said blade means, said annular hydrofoil including an inner inclined surface engageable by the pressure fluid discharge from said blade means so that said hydrofoil produces a forward axial thrust on said impeller.

2. A thrust balancing impeller adapted to be coupled to a drive shaft of a drive means for moving a portion of a fluid environment upon rotation of the impeller by said drive means including;
   a hub adapted to be coupled to said drive shaft and for rotating with said drive shaft in a fluid environment,
   blade means coupled to said hub for rotating therewith in said environment for inducing flow of the environmental fluid upon rotation of said drive shaft and
   an endless hydrofoil having an annular configuration with its inner perimeter beveled, said endless hydrofoil coupled to the outer periphery of said blade means so that at least part of said endless hydrofoil is aligned in the flow path of the environmental fluid, the surface of said inner perimeter of said hydrofoil engageable by the pressure fluid discharge from said blade means so that said hydrofoil produces a forward axial thrust on said impeller.

3. A device for circulating water in a tank in which the thrust generated by rotation of the water impeller is balanced out by an anti-thrust member including;
   a circulating chamber having an inlet port and an outlet port, said inlet port for receiving water to be circulated,
   a motor housing for supporting a motor means,
   a shaft housing connecting said circulating chamber and said motor housing,
   a drive shaft coupled to said motor means and extending through said shaft housing into said circulating chamber,
   impeller means coupled to said drive shaft extending into said circulating chamber, said impeller means including;
   a hub adapted for receiving said drive shaft for rotating with said drive shaft,
   blade means coupled to said hub for rotating therewith for inducing circulation of the water into said inlet port, through said circulating chamber and out said outlet port upon rotation and
   an endless hydrofoil defining an annulus coupled to and carried by the outer periphery of said blade means, and said endless hydrofoil includes an inner inclined surface engageable by the pressure fluid discharge from said blade means so that said endless hydrofoil produces a forward axial thrust on said impeller means.

4. A device for pumping fluids by rotating an impeller positioned in the fluid and in which the thrust generated by rotation of the impeller is counterbalanced by an anti-thrust force generating member including,
   a pump housing including a pump chamber, an inlet port for receiving the fluid and an outlet port for expelling the fluid,
   a motor housing for supporting a motor and,
   a drive shaft housing connecting said pump housing, and said motor housing,
   a drive shaft coupled to said motor and extending through said drive shaft housing into said pump chamber,
   an impeller in said pump chamber and coupled to said drive shaft, said impeller including;
   a hub adapted for receiving said drive shaft for rotating with said drive shaft, and
   blade means coupled to said hub for rotating with said hub for inducing flow of the fluid received in the pump chamber via said inlet port, when rotated,
   an anti-thrust generating member coupled to said hub for generating an anti-thrust force in response to relative movement between said member and said fluid, said member including;
   an endless hydrofoil defining an annulus for generating a forward axial thrust on the impeller when in motion with respect to the fluid flowing through said pump chamber and over the surface of said hydrofoil and
   means for coupling said endless hydrofoil to the outer periphery of said blade means for permitting free flow of fluid entering said pump chamber over and under the surface of said hydrofoil, said hydrofoil including an inner inclined surface engageable by the pressure fluid discharge from said blade means thereby generating a forward axial thrust exerted axially along said drive shaft providing an anti-thrust force for counter balancing the thrust generated by rotation of the impeller.

References Cited

UNITED STATES PATENTS

| 3,010,402 | 11/1961 | King. | |
|---|---|---|---|
| 3,055,304 | 9/1962 | Ziegler. | |
| 3,260,214 | 7/1966 | Goettl et al. | |
| 890,662 | 6/1908 | Lager | 103—112 |
| 1,065,732 | 6/1913 | Schneible | 103—112 |
| 1,149,633 | 8/1915 | Chapman | 103—112 |
| 3,055,304 | 9/1962 | Ziegler. | |

FOREIGN PATENTS

| 676,564 | 11/1929 | France. |
|---|---|---|
| 904,849 | 3/1945 | France. |
| 745,976 | 3/1956 | Great Britain. |

HENRY F. RADUAZO, Primary Examiner

U.S. Cl. X.R.

103—87, 103, 115